(12) United States Patent
Yeom (10) Patent No.: US 7,591,579 B2
(45) Date of Patent: Sep. 22, 2009

(54) LIGHT SOURCE MODULE AND DISPLAY DEVICE HAVING THE SAME

(75) Inventor: Moon Soo Yeom, Gyeongbuk (KR)

(73) Assignee: LG Display Co., Ltd., Seoul (KR)

( * ) Notice: Subject to any disclaimer, the term of this patent is extended or adjusted under 35 U.S.C. 154(b) by 33 days.

(21) Appl. No.: 11/898,650

(22) Filed: Sep. 13, 2007

(65) Prior Publication Data

US 2008/0106912 A1 May 8, 2008

(30) Foreign Application Priority Data

Nov. 2, 2006 (KR) .................. 10-2006-0107561

(51) Int. Cl.
*F21V 7/04* (2006.01)
(52) U.S. Cl. .................. 362/613; 362/612; 349/65; 349/68

(58) Field of Classification Search ......... 362/611–614; 349/65, 68
See application file for complete search history.

(56) References Cited

U.S. PATENT DOCUMENTS 7,350,955 B2 * 4/2008 Chang et al. ................ 362/612

* cited by examiner

*Primary Examiner*—Stephen F Husar
(74) *Attorney, Agent, or Firm*—Holland & Knight LLP (57) ABSTRACT

A light source module includes a light guide plate having a light incident surface receiving light and a light emitting surface emitting the received light, a board arranged adjacent to the light guide plate and having a light source mounting surface, at least one first light source disposed on the light source mounting surface of the board to provide a first light to the light incident surface of the light guide plate, and at least one second light source disposed on both sides of the light source mounting surface adjacent to the first light source to provide a second light toward the first light source.

19 Claims, 10 Drawing Sheets

LIGHT SOURCE MODULE AND DISPLAY DEVICE HAVING THE SAME

This invention claims the benefit of Korean Patent Application No. 10-2006-107561 filed in Korea on Nov. 2, 2006, which is hereby incorporated by reference in its entirety.

BACKGROUND OF THE INVENTION

1. Field of the Invention

Embodiments of the present invention relate to a light source, and more particularly, to a light source module and a display device having the same.

2. Description of the Related Art

In recent years, research and development have been conducted on information processing devices that can process a large amount of data in a short amount of time as well as for the display devices that can display the processed data. More specifically, the display devices convert an electrical signal processed by the information processing devices into an image signal. Examples of such display devices include a liquid crystal display (LCD) device using liquid crystal, an organic light emitting device (OLED) using organic light emitting material, and a plasma display panel (PDP) using plasma.

The LCD device includes a liquid crystal panel and a light source module. The liquid crystal panel includes a top substrate, a bottom substrate, and a liquid crystal layer interposed between the two substrates. The light source module provides light to the liquid crystal panel.

The light source module includes a light guide plate disposed under the liquid crystal panel and a light source disposed on one side of the light guide plate. A cold cathode fluorescent lamp (CCFL) is typically used as the light source. Meanwhile, interest in a light emitting diode (LED) is growing because it has low power consumption, a compact size, and high reliability compared to the CCFL.

The LED, however, has large brightness deviations of light provided to a light incident surface of the light guide plate. Therefore, dark spots and hot spots occur in the light guide plate. The dark spots represent regions where light is not provided, and the hot spots represent regions where light intensity is greater than in other regions. Consequently, uniform light is not provided to the liquid crystal panel. In addition, since light is not provided to the liquid crystal panel at the dark spot regions of the light guide plate, useless dark space is formed in the light guide plate. As a result, there is a limitation to compacting a light source module for use in small displays.

When an external impact occurs to the light guide plate, the light source may be damaged by a collision between the light guide plate and the light source. To solve this problem, securing members are installed on both sides of the light guide plate facing the light source. However, since the securing members block light emitted from the light source toward the light guide plate, dark spaces are formed corresponding to the securing members so that portions of the light guide plates are darkened.

SUMMARY OF THE INVENTION

Accordingly, embodiments of the present invention are directed to a light source module and a display device having the same that substantially obviate one or more problems due to limitations and disadvantages of the related art.

An object of embodiments of the present invention is to provide a light source module that can reduce a brightness deviation of light provided to a light guide plate.

Another object of embodiments of the present invention is to provide a display device having the light source module.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a light source module including a light guide plate having a light incident surface receiving light and a light emitting surface emitting the received light, a board arranged adjacent to the light guide plate and having a light source mounting surface, at least one first light source disposed on the light source mounting surface of the board to provide a first light to the light incident surface of the light guide plate, and at least one second light source disposed on both sides of the light source mounting surface adjacent to the first light source to provide a second light toward the first light source.

In another aspect, there is provided a display device including: a light source module including a light guide plate having a light incident surface receiving light and a light emitting surface emitting the received light, a board arranged adjacent to the light guide plate and having a light source mounting surface, at least one first light source disposed on the light source mounting surface of the board to provide a first light to the light incident surface of the light guide plate; and at least one second light source disposed on both sides of the light source mounting surface adjacent to the first light source to provide a second light toward the first light source, and a display unit disposed on the light emitting surface of the light guide plate to display an image using the first light and the second light emitted from the light emitting surface of the light guide plate.

It is to be understood that both the foregoing general description and the following detailed description of the present invention are exemplary and explanatory and are intended to provide further explanation of the embodiments as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

A light source module and a display unit having the same according to embodiments of the present invention will be described in detail with reference to the accompanying drawings. However, the present invention is not limited to the embodiments set forth herein; rather, it will be understood by those skilled in the art that various changes in form an details may be made therein without departing from the spirit and scope of the invention.

Figure 1A:
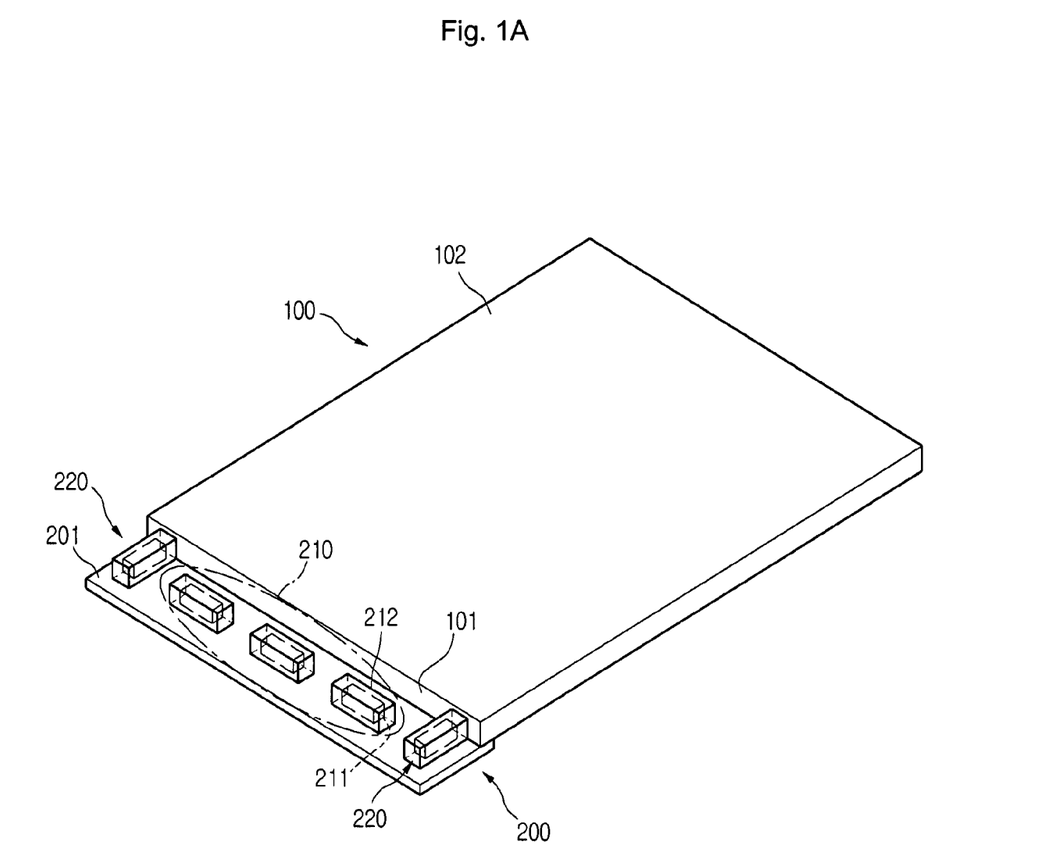
FIG. 1A is a perspective view of a light source module according to a first embodiment of the present invention.
Figure 1B:
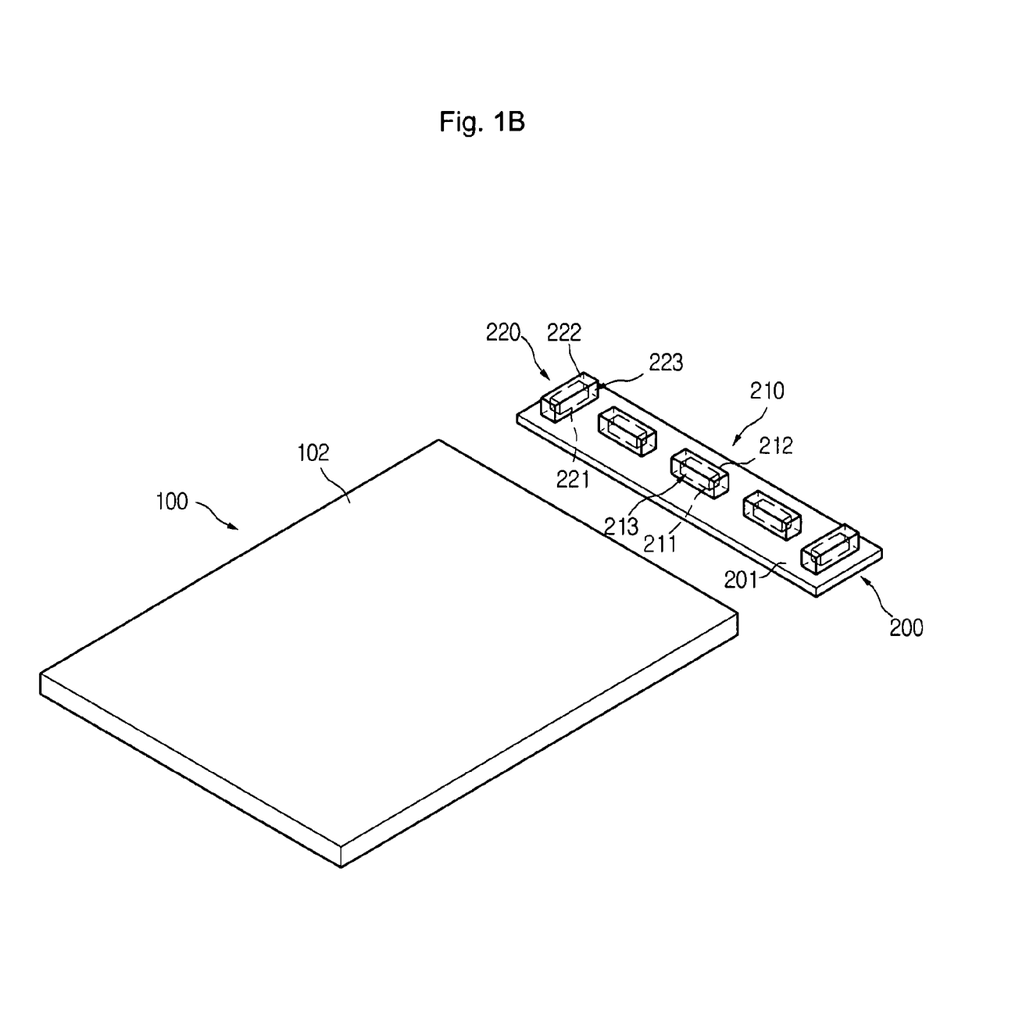
FIG. 1B is an exploded perspective view of the light source module shown in FIG. 1A.
Figure 1C:
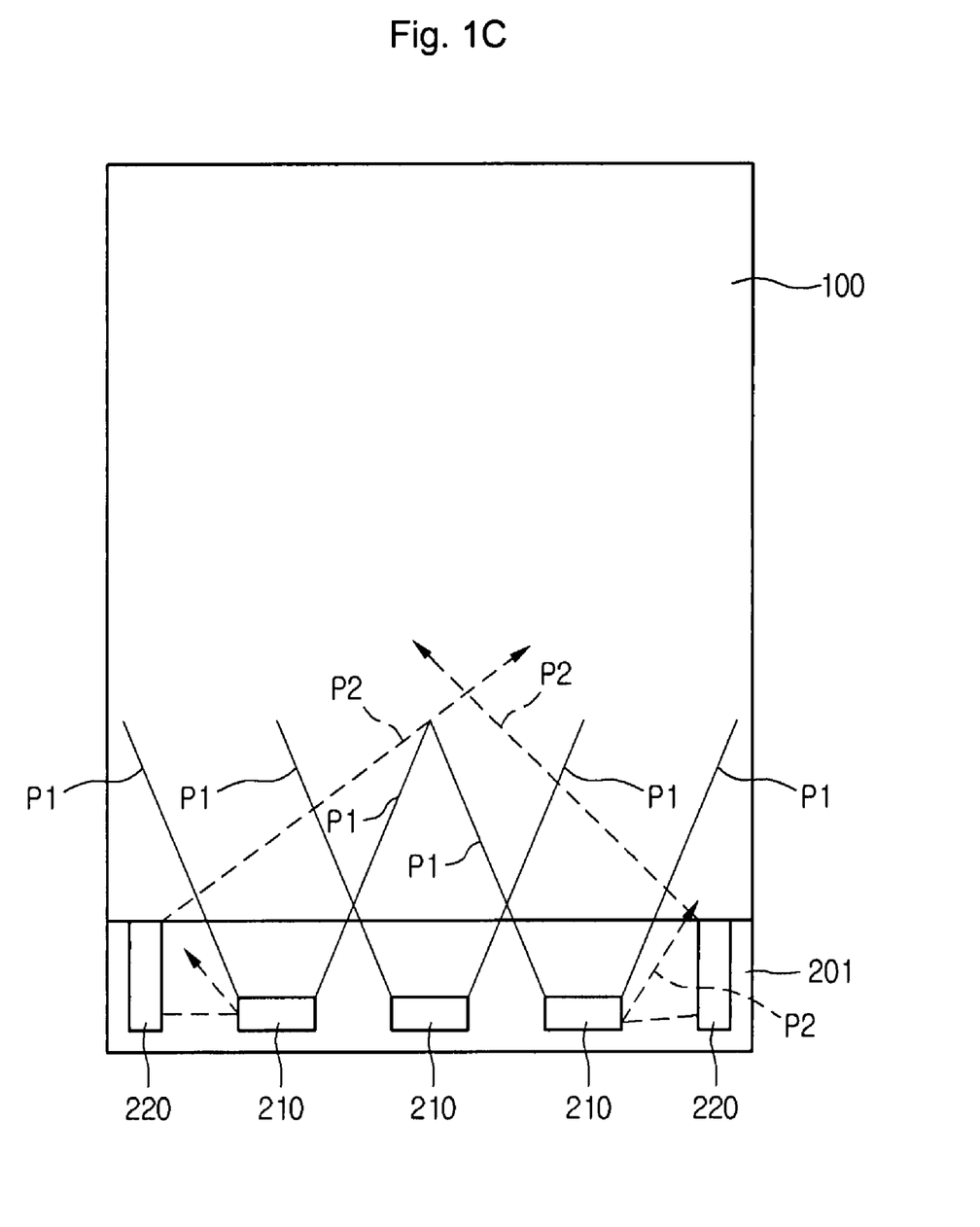
FIG. 1C is a plan view of the light source module shown in FIG. 1A.

FIGS. 1A to 1C illustrate a light source module according to a first embodiment of the present invention. More specifically, FIG. 1A is a perspective view of the light source module according to the first embodiment of the present invention, FIG. 1B is an exploded perspective view of the light source module shown in FIG. 1A, and FIG. 1C is a plan view of the light source module shown in FIG. 1A. As shown in FIGS. 1A to 1C, the light source module includes a light guide plate 100, a board 200, a plurality of first light sources 210, and a plurality of second light sources 220.

The light guide plate 100 includes a light incident surface 101 receiving light and a light emitting surface 102 connected perpendicular to the light incident surface 101. Light generated from a point light source is incident onto the light guide plate 100 through the light incident surface 101, and the light guide plate 100 improves the optical distribution of the incident light. In this way, light having a uniform brightness distribution is emitted outside the light guide plate 100 through the light emitting surface 102.

The board 200 has a light source mounting surface 201 where the first light sources 210 and the second light sources 220 are arranged. The light source mounting surface 201 can be disposed substantially perpendicular to the light incident surface 101 of the light guide plate 100. In addition, the board 200 can include a driving circuit (not shown) for driving the first and second light sources 210 and 220.

The first light sources 210 are disposed on the light source mounting surface 201 to provide a first light P1 to the light incident surface 101 of the light guide plate 100. The first light sources 210 are arranged spaced apart from one another on the light source mounting surface 201 and have an orientation that is parallel to the light incident surface 101 of the light guide plate 100. Each of the first light sources 210 includes a first light generating element 211 for generating the first light P1, and a first cover 212 for receiving the first light generating element 211. The first light generating element 211 is an LED that can generate white light. For example, the first light generating element 211 generates red light, green light, and blue light so as to generate the white light.

The first cover 212 has a first light transmitting surface 213 through which the first light P1 is emitted. For example, the first cover 212 may have a rectangular parallelepiped box shape with at least four side surfaces. The first light transmitting surface 213 is one of the four side surfaces of the first cover 212 and is a transparent surface or an opened surface through which light can be transmitted. The first light transmitting surface 213 of the first cover 212 faces the light incident surface 101 of the light guide plate 100. Accordingly, the first light P1 provided form the first light generating element 211 passes through the first light transmitting surface 213 and is incident onto the light incident surface 101. The other side surfaces, except the first light transmitting surface 213, are provided with boards that prevent the first light P1 from being emitted outside the first cover 212.

A portion of a second light P2 provided from the second light source 220 is reflected from an outer surface of the first cover 212, except for the first light transmitting surface 213, and then is provided to the light incident surface 101 of the light guide plate 100. The second light P2 reflected from the outer surface of the first cover 212 is provided to the light incident surface 210 (i.e., dark spots) corresponding to a gap between the first light sources 210. Therefore, the brightness deviation of the light guide plate 100 is reduced.

The second light sources 220 are disposed adjacent to both sides of the first light sources 210 in the light source mounting surface 201 and have an orientation that is perpendicular to the light incident surface 101 of the light guide plate 100. Thus, the first light sources 210 generally emit light in a first direction that is perpendicular to a second direction at which the second light sources 220 generally emit light. For example, the second light sources 220 may be disposed on two edges of the light incident surface 101 of the light guide plate 100. The second light source 220 includes a second light generating element 221 and a second cover 222. The second cover 222 receives the second light generating element 221 and has a second light transmitting surface 223 facing the first light source 210.

A portion of the second light P2 is provided to the outer surface of the first cover 212 of the first light source 210. The second light P2 provided to the outer surface of the first cover 212 is reflected toward the light incident surface 101 of the light guide plate 100. In addition, a portion of the second light P2 is reflected by lines of the driving circuit disposed on the light source mounting surface 201 and then is provided to the light incident surface 101. Most of the second light P2 reflected from the first cover 212 and the light source mounting surface 201 is provided to the dark spots of the light incident surface 101, thereby reducing brightness deviation in the light from the light guide plate 100.

The first and second light sources 210 and 220 have a rectangular parallelepiped shape with a major direction and a minor direction. The major direction of the first light source 210 is parallel to the light incident surface 101, and the major direction of the second light source 220 is perpendicular to the light incident surface 101 on the light source mounting surface 201. The first light source 210 is spaced apart from the light incident surface 101. The second light source 220 contacts the light incident surface 101 such that it supports and secures the light guide plate 100 in a fixed relation to the light source mounting surface 201. Therefore, when an external impact is occurs, a collision between the light guide plate 100 and the first light source 210 can be prevented. Since the second cover 222 of the second light source 220 contacts the light guide plate 100, the second light source 220 is prevented from being damaged by the light guide plate 100.

In this embodiment, the second light P2 emitted from the second light source 220 is reflected from the first light source 210 or the light source mounting surface 201 and then is provided to the dark spots of the light guide plate 100. In this way, the second light P2 is provided to a portion of the light guide plate 100 where the first light P1 is not provided, thereby reducing the brightness deviation of the light guide plate 100. In addition, since the second light source 220 secures and supports the light guide plate 100, a collision between the light guide plate 100 and the first light source 210 can be prevented. Therefore, the light source module according to the first embodiment of the present invention requires no additional securing members.

Figure 2A:
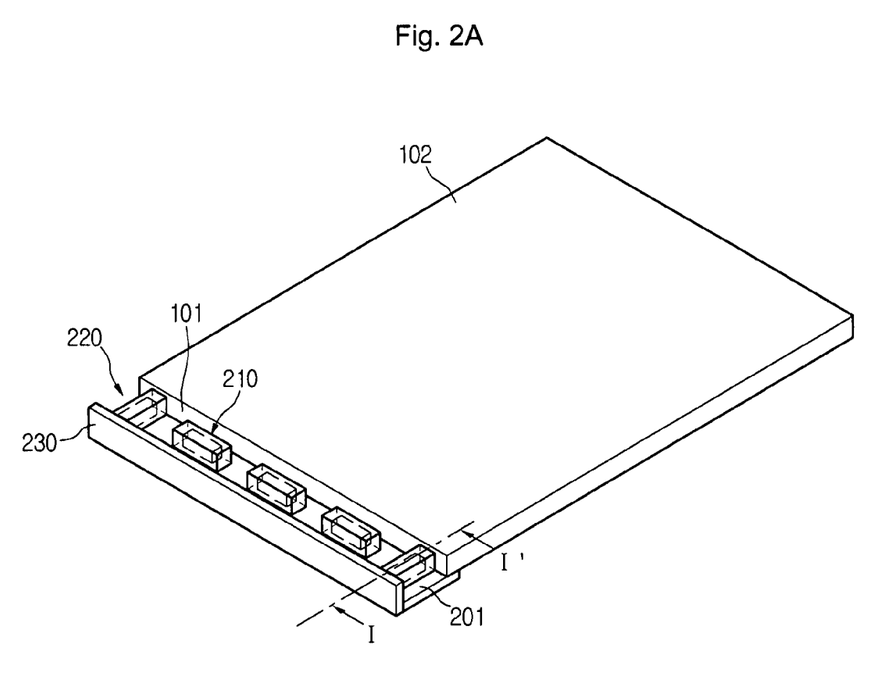
FIG. 2A is a perspective view of a light source module according to a second embodiment of the present invention.
Figure 2B:
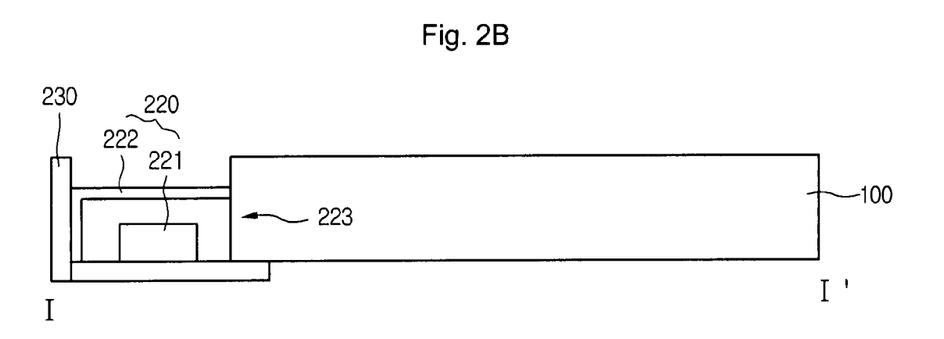
FIG. 2B is a cross-sectional view taken along line I-I' of FIG. 2A.
Figure 2C:
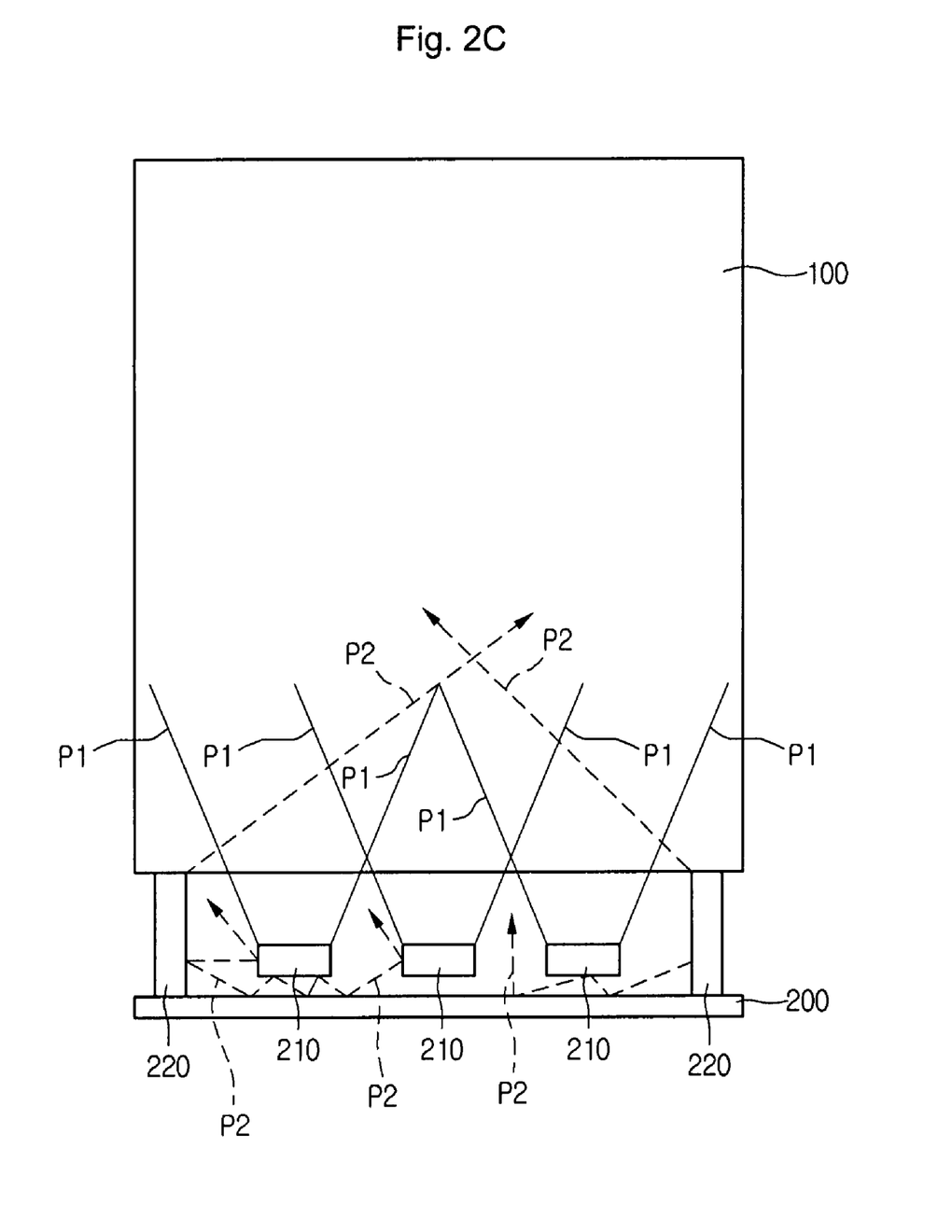
FIG. 2C is a plan view of the light source module shown in FIG. 2A.

FIGS. 2A to 2C illustrate a light source module according to a second embodiment of the present invention. Specifically, FIG. 2A is a perspective view of the light source module according to the second embodiment of the present invention, FIG. 2B is a cross-sectional view taken along line I-I' of FIG. 2A, and FIG. 2C is a plan view of the light source module shown in FIG. 2A. The light source module shown in FIGS. 2A to 2C has a structure substantially identical to that shown in FIGS. 1A to 1C, except for the use of a first light reflector 230. Duplicate description about the same components will be omitted for purposes of conciseness and the same reference numbers and terms will be used to refer to the same components.

Referring to FIGS. 2A to 2C, the light source module includes a light guide plate 100, a board 200, a plurality of first light sources 210, a plurality of second light sources 220, and a first light reflector 230 for reflecting light to the light guide plate 100. The first light reflector 230 can be flat or curved with respect to a light incident surface 101 of the light guide plate 100. The first light reflector 230 can be formed of a material that can reflect light. In addition, the first light reflector 230 can include a reflection layer that can reflect light on one side surface of a body facing the light incident surface 101.

The first light reflector 230 faces the light incident surface 101 of the light guide plate 100 and is disposed on an edge of the board 200. The first light reflector 230 is disposed perpendicular to a second light transmitting surface 223 of the second light source 220. Accordingly, the first light reflector 230 reflects a portion of a second light P2 directly provided from the second light source 220 and provides the reflected light to the light incident surface 101 of the light guide plate 100. In addition, the first light reflector 230 again reflects the second light P2 reflected from a first cover 211 of the first light source 210 and provides the reflected light to the light incident surface 101 of the light guide plate 100.

When an excessive external impact occurs to the light guide plate 100, the second light source 220 may not be able to support and secure the light guide plate 100. Thus, the second light source 220 may be separated from the board 200 by the light guide plate 100. To prevent such an occurrence, the first light reflector 230 supports and affixes the second light source 220. That is, one side surface of the second light source 220 contacts the light guide plate 100, and the other surface facing the one side surface of the second light source 220 contacts the first light reflector 230. Therefore, the second light source 220 can support and secure the light guide plate 100 more firmly.

As described above, the light source module further includes the first light reflector 230 that reflects the second light P2, which may leak out to the outside, to the light incident surface 101, thereby improving the light efficiency of the light source module. In addition, since the first light reflector 230 supports and secures the second light source 220, the second light source 220 is prevented from being separated from the board 200 due to an impact from the light guide plate 100.

Figure 3:
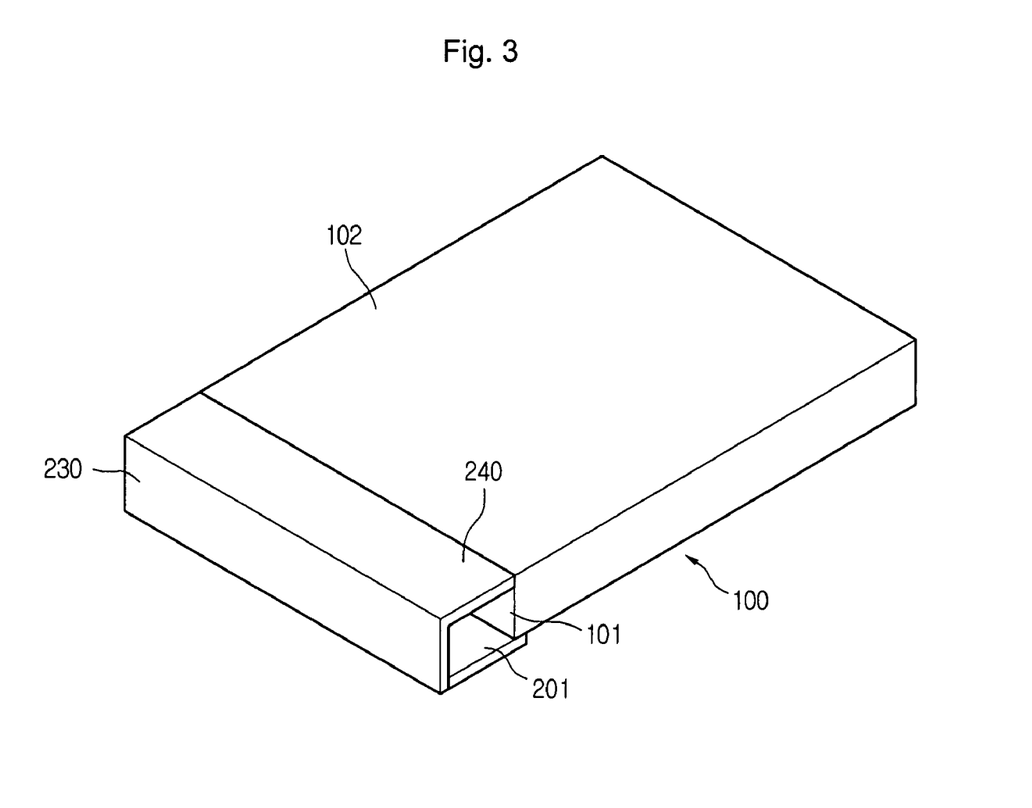
FIG. 3 is a perspective view of a light source module according to a third embodiment of the present invention.

FIG. 3 is a perspective view of a light source module according to a third embodiment of the present invention. The light source module shown in FIG. 3 has a structure substantially identical to that shown in FIGS. 2A to 2C, except for the use of a second light reflector 240 in addition to the first reflector 230. Duplicate description about the same components will be omitted for the purposes of conciseness and the same reference numbers and terms will be used to refer to the same components.

Referring to FIG. 3, the light source module includes a light guide plate 100, a board 200, a plurality of first light sources 210, a plurality of second light sources 220, a first light reflector 230, and a second light reflector 240 for reflecting light to the light guide plate. The second light reflector 240 faces a light source mounting surface 201 and is disposed on an edge of the first light reflector 230. The first light reflector 230 and the second light reflector 240 enclose the first and second light sources 210 and 220.

The second light reflector 240 additionally provides reflected first light P1 and reflected second light P2 to a light incident surface 101 of the light guide plate 100. That is, the second light reflector 240 reflects first and second light P1 and P2 leaking out in a direction facing the light source mounting surface 201 and provides the reflected light to the light incident surface 201. The second light reflector 240 may be flat or curved with respect to the light source mounting surface 201. The second light reflector 240 can be formed of a material that can reflect light. In the alternative, the second light reflector 240 can be formed of a non-reflective material coated with a light reflecting material on one surface of the material facing the light source mounting surface 201. The second light reflector 240 together with the first reflector 230, reduce light leakage. Therefore, the light efficiency of the light source module is further improved.

Figure 4:
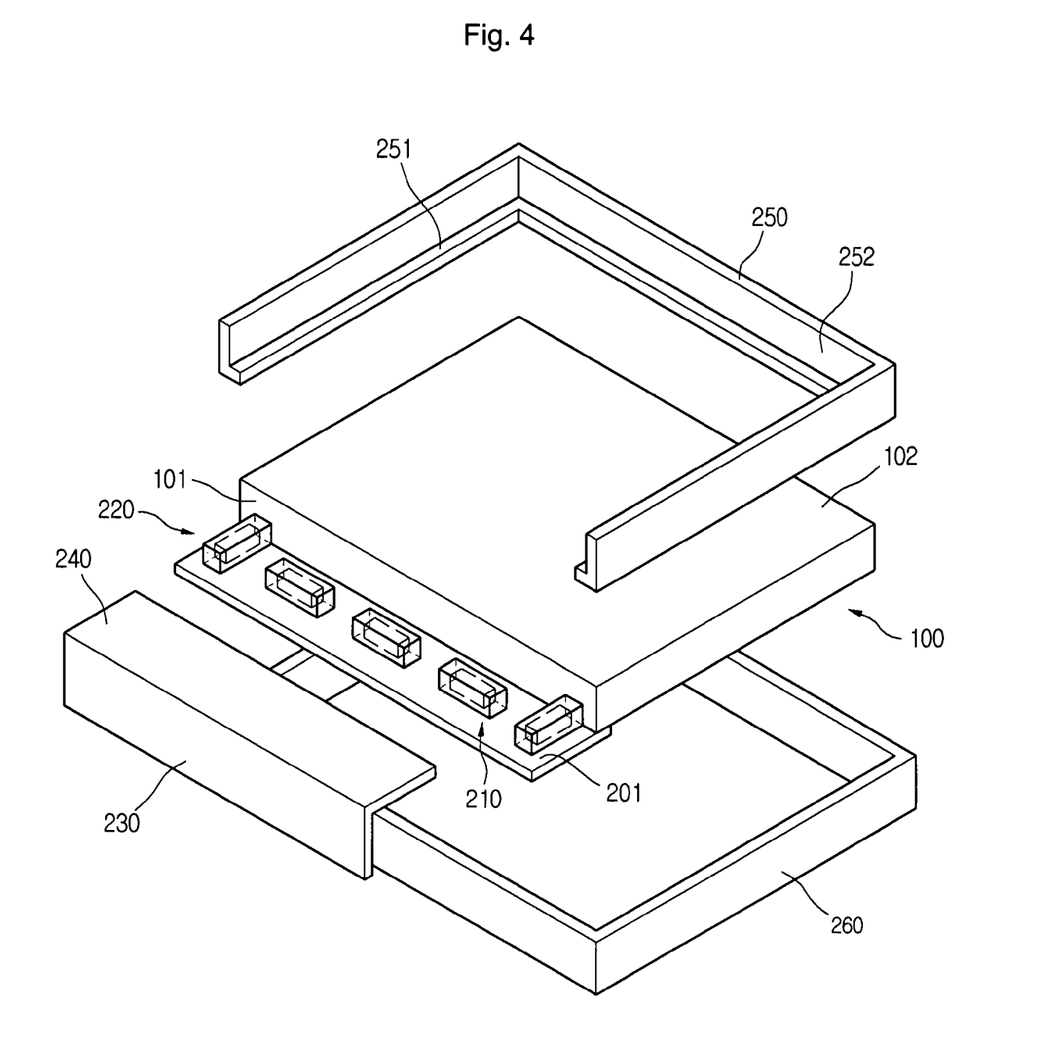
FIG. 4 is a perspective view of a light source module according to a fourth embodiment of the present invention.

FIG. 4 is a perspective view of a light source module according to a fourth embodiment of the present invention. The light source module shown in FIG. 4 has a structure substantially identical to that shown in FIGS. 1A to 1C, except a mold frame 250 and a bottom case 260. Duplicate description about the same components will be omitted for purposes of conciseness and the same reference numbers and terms will be used to refer to the same components.

Referring to FIG. 4, the light source module includes a light guide plate 100, a board 200, a plurality of first light sources 210, a plurality of second light sources 220, a first light reflector 230, a second light reflector 240, and a mold frame 250 for holding the light guide plate 100 in position within the bottom case 260. The mold frame 250 includes three side surfaces 252 and a bottom plate 251. The three side surfaces 252 cover three sidewalls of the light guide plate 100 and two sidewalls of the board 200. Therefore, the mold frame 250 has a "⊏"shape in a plan view. However, embodiments of the present invention are not limited to the "⊏"shape. The mold frame 250 may have a rectangular frame shape in a plan view. The bottom plate 251 receives the light guide plate 100.

In the alternative, the light source module may further include a reflection sheet (not shown) disposed on the bottom plate 251. The reflection sheet reflects light leaking from a bottom surface of the light guide plate 100 to the light emitting surface. Therefore, the light efficiency of the light source module can be improved.

In the alternative, the light source module can further include a reflecting plate (not shown) interposed between the mold frame 250 and the bottom case 260. The reflecting plate reflects light leaking from the bottom surface of the mold frame 250 toward the light guide plate 100, thereby improving the light efficiency of the light source module.

Moreover, the light source module may further include optical sheets (not shown) disposed on the light guide plate 100. The optical sheets may include a diffusion sheet for enhancing the brightness uniformity of light emitted from the light source module, and a prism sheet for condensing light diffused from the diffusion sheet.

In addition or in another alternative, a light reflection layer (not shown) can be further provided on one side surface of the bottom case 260 facing the light source module. Therefore, a second light P2 provided from the second light source 220 is reflected from the side surface of the bottom case 260 and provided to the light incident surface 101.

Figure 5A:
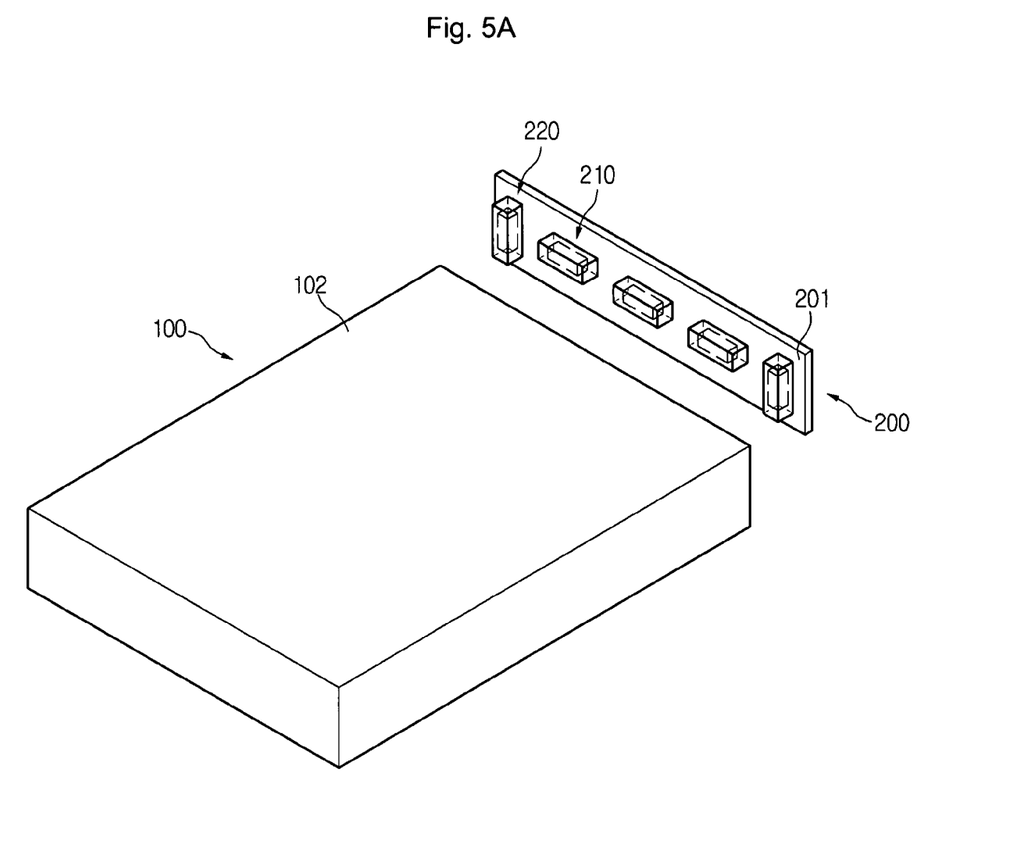
FIG. 5A is an exploded perspective view of a light source module according to a fifth embodiment of the present invention.
Figure 5B:
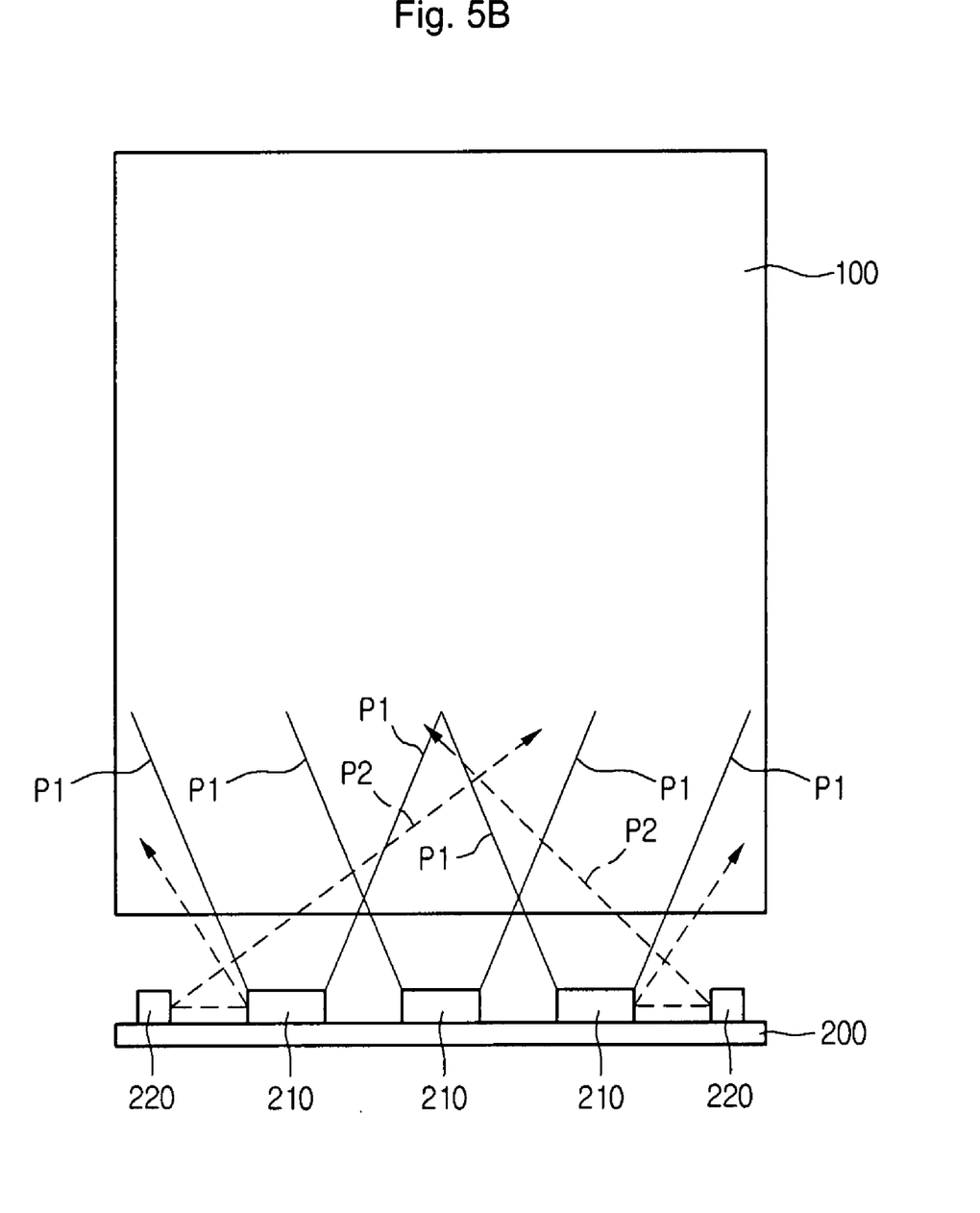
FIG. 5B is a plan view of the light source module according to the fifth embodiment of the present invention.

FIGS. 5A and 5B illustrate a light source module according to a fifth embodiment of the present invention. Specifically, FIG. 5A is an exploded perspective view of the light source module according to the fifth embodiment of the present invention, and FIG. 5B is a plan view of the light source module shown in FIG. 5A. The light source module shown in FIGS. 5A and 5B has components substantially identical to that shown in FIGS. 1A to 1C. However, the arrangement of the light source mounting surface and light transmitting surfaces with respect to a light guide plate are different. Duplicate description about the same components will be omitted for purposes of conciseness and the same reference numbers and terms will be used to refer to the same components.

Referring to FIGS. 5A and 5B, the light source module includes a light guide plate 100, a board 200, a plurality of first light sources 210, and a plurality of second light sources 220. The board 200 is disposed such that a light source mounting surface 201 of the board 200 faces the light incident surface 101 of the light guide plate 100. The board 200 includes a driving circuit for driving the first and second light sources 210 and 220, and a plurality of lines. The board 200 may further include a reflection layer (not shown) on the light source mounting surface 201. The reflection layer reflects light from the first and second light sources 210 and 220 to the light incident surface 101.

The first light source 210 is disposed on the light source mounting surface 201. A first light transmitting surface 213 of the first light source 210 faces the light incident surface 101 and provides a first light P1 emitted from the first light source 210 to the light incident surface 101. The second light source 220 is disposed outside the first light source on the light source mounting surface 201. A second light transmitting surface 223 through which a second light P2 is emitted is, disposed to face the first light source 210, so that the second light P2 is emitted toward the first light source 210. The second light P2 is reflected by a reflecting material, such as the lines of the light source mounting surface 201, to the light incident surface 101. The second light P2 is provided to prevent dark spots in the light guide plate 100, thereby reducing the brightness deviation of light from the light guide plate 100.

Figure 6:
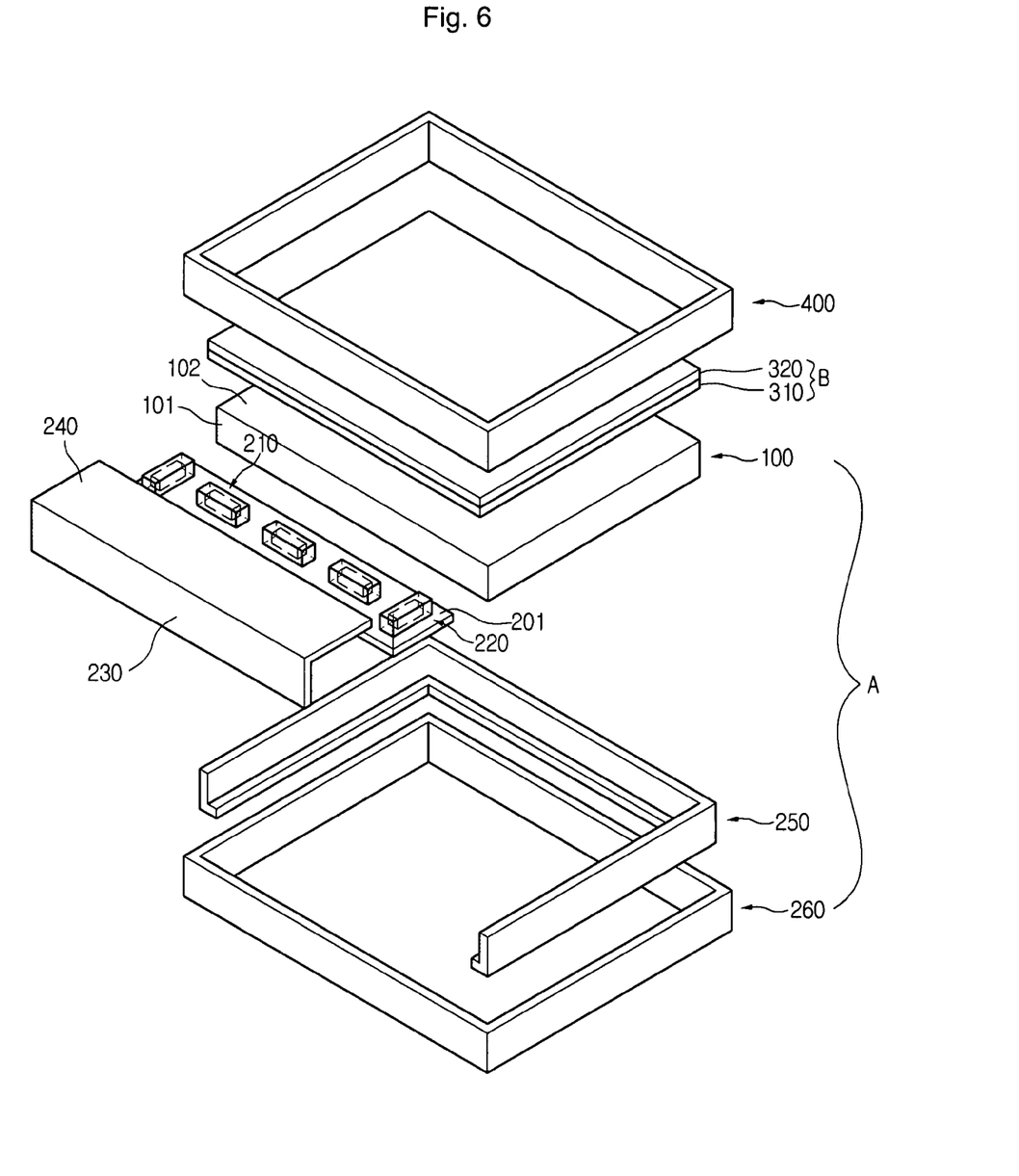
FIG. 6 is an exploded perspective view of a display device according to an embodiment of the present invention.

FIG. 6 is an exploded perspective view of a display device according to an embodiment of the present invention. Referring to FIG. 6, the display device includes a light source module A and a display unit B. The light source module A includes a light guide plate 100, a board 200, a plurality of first light sources 210, and a plurality of second light sources 220. The light guide plate 100 includes a light incident surface 101 receiving light, and a light emitting surface 102 connected to edges of the light incident surface 101 to provide the received light to the display unit B, which will be described later.

The board 200 has a light source mounting surface 201 on which the first and second light sources 210 and 220 are attached. In addition, the board 200 includes a driving circuit (not shown) for driving the first and second light sources 210 and 220, and a plurality of lines (not shown). The board 200 is disposed adjacent to the light incident surface 101, such that the first and second light sources 210 and 220 can provide light to the light incident surface 101 of the light guide plate 100. In addition, the board 200 may further include a reflection layer on the light source mounting surface 201 so as to reflect light to the light incident surface 101.

The first light source 210 includes a first light generating element 211 and a first cover 212. The first light generating element 211 generates a first light, and the first cover 212 encloses the first light generating element 211 and has a first light transmitting surface 213 through which the first light is emitted. The first cover 212 may be formed of a material that can reflect light. Alternatively, an outer surface of the first cover 212 is coated with a light reflecting material so as to reflect light that is incident onto the first cover 212.

The second light source 220 provides a second light to a side surface of the first light source 210, such as the first cover 212. The first cover 212 reflects a portion of the second light to dark spots of the light incident surface 101. The first light source 210 provides light to the light incident surface 101 and the second light source 220 provides light to spots where the first light is not provided on the light incident surface 101.

Therefore, the brightness deviation of the light guide plate 100 can be reduced.

The light source mounting surface 201 of the board 200 may be disposed to face the light incident surface 101 of the light guide plate 100. Alternatively, the light source mounting surface 201 of the board 200 may be disposed perpendicular to the light incident surface 101 of the light guide plate 100. For example, when the board 200 is disposed in the light guide plate 100 such that the light source mounting surface 201 is substantially perpendicular to the light incident surface 101 of the light guide plate 100, the light source module A may further include at least one of a first light reflector 240 and a second light reflector 250 so as to improve the light efficiency of the light source module A. The first light reflector 240 is arranged to face the light incident surface 101 and is disposed on an edge of the board 200 to reflect the second light to the light incident surface 101. The second light reflector 250 is disposed to face the light source mounting surface 201 and additionally reflect the second light to the light incident surface 101. That is, the first and second light reflectors 240 and 250 reflect light that would otherwise leak to the outside toward the light incident surface 101, thereby improving the light efficiency. More specifically, the first and second light reflectors 240 and 250 provide the second light emitted from the second light source 220 to spots of the light incident surface 101 that do not receive light from the first light source 210, thereby reducing the brightness deviation of the light guide plate 100 more effectively.

The second light source 220 contacts the light incident surface 101 and supports and secures the light guide plate 100. That is, the second light source 220 also serves as an affixing member for preventing the movement of the light guide plate 100, thereby preventing an collision between the light guide plate 100 and the first light source 210 due to an external impact. In this embodiment, no additional fixing member is needed on the mold frame so as to prevent the collision between the light guide plate 100 and the first light source 210, which is caused when the light guide plate 100 moves to the first light source 210.

The light source module A may include the mold frame 250 for covering sidewalls of the light guide plate 100 and sidewalls of the board 200 disposed on one side of the light guide plate 100 and receiving the light guide plate 100 and the board 200 to affix the board 200 to the light guide plate 100. In addition, the light source module A may further include a bottom case 260 connected to the mold frame 250 to receive the light guide plate 100 and the board 200. Further, the light source module A may further include a reflection layer (not shown) interposed between the mold frame 250 and the bottom case 260. The light source module A may further include optical sheets (not shown) disposed on the light guide plate 100. In this embodiment, the optical sheets may include a diffusion sheet for enhancing the brightness uniformity of light emitted from the light source module A, and a prism sheet for condensing light diffused from the diffusion sheet.

The display unit B is disposed on the light source module A to display an image using light provided from the light source module A. The display unit B is supported and fixed by the module frame 250.

The display unit B includes a first substrate 310, a second substrate 320, a liquid crystal layer (not shown), and a flexible circuit board (not shown). The first substrate 310 includes thin film transistors (TFTs) and pixel electrodes connected to the respective TFTs. The second substrate 320 is disposed to face the first substrate 310 and includes a color filter (not shown). The liquid crystal layer (not shown) is interposed between the first substrate 310 and the second substrate 320. The flexible circuit boar (not shown) provides a driving signal to the TFTs of the first substrate 310.

In this embodiment, the display unit B further includes a top case 400 connected to the bottom case 120 to fix the display unit B to the light source module A. The top case 400 has a frame shape with an opening exposing an upper portion of the display unit B.

As described above, the light source module further includes a secondary light source that provides light to the spots of the light guide plate that do not receive light from the primary light source, thereby reducing the brightness deviation in the light guide plate. Moreover, since the secondary light source serves as an affixing member for securing the light guide plate, the dark space due to the fixing member can be reduced. Consequently, the display device can be made more compact.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A light source module comprising:
    a light guide plate having a light incident surface receiving light and a light emitting surface emitting the received light;
    a board arranged adjacent to the light guide plate and having a light source mounting surface;
    at least one first light source disposed on the light source mounting surface of the board to provide a first light to the light incident surface of the light guide plate; and
    at least two second light sources disposed on both sides of the light source mounting surface adjacent to the first light source to provide a second light toward the first light source,
    wherein the second light sources are disposed on two edges of the light incident surface of the light guide plate, and
    wherein the light source mounting surface is substantially perpendicular to the light incident surface.

2. The light source module according to claim 1, wherein the first light source includes:
    a light generating element for generating the first light; and
    a first cover for receiving the light generating element, the first cover having a first light transmitting surface through which the first light is transmitted.

3. The light source module according to claim 1, further comprising a first light reflector disposed on an edge of the board in parallel to the light incident surface.

4. The light source module according to claim 3, further comprising a second light reflector connected to an edge of the first light reflector and disposed to face the light source mounting surface.

5. The light source module according to claim 1, wherein the second light source supports and fixes the light guide plate so as to prevent the light guide plate from moving toward the first light source.

6. The light source module according to claim 1, wherein the light source mounting surface is parallel to and faces the light incident surface.

7. The light source module according to claim 6, wherein the light source mounting surface reflects the second light to the light incident surface.

8. The light source module according to claim 1, wherein the board includes a driving circuit for driving the first and second light sources.

9. The light source module according to claim 1, further comprising a mold frame for covering sidewalls of the light guide plate and receiving the light guide plate to secure the light guide plate relative to the board.

10. The light source module according to claim 9, further comprising a bottom case to receive the mold frame, light guide plate and board.

11. The light source module according to claim 1, wherein the first and second light sources are implemented with light emitting diodes to generate white light.

12. The light source module according to claim 1, wherein each of the first and second light sources is implemented with light emitting diodes to generate red light, green light, and blue light.

13. A display device comprising:
    a light source module including:
    a light guide plate having a light incident surface receiving light and a light emitting surface emitting the received light;
    a board arranged adjacent to the light guide plate and having a light source mounting surface;
    at least one first light source disposed on the light source mounting surface of the board to provide a first light to the light incident surface of the light guide plate; and
    at least two second light sources disposed on both sides of the light source mounting surface adjacent to the first light source to provide a second light toward the first light source; and
    a display unit disposed on the light emitting surface of the light guide plate to display an image using the first light and the second light emitted from the light emitting surface of the light guide plate,
    wherein the second light sources are disposed on two edges of the light incident surface of the light guide plate, and
    wherein the light source mounting surface is substantially perpendicular to the light incident surface.

14. The display device according to claim 13, further comprising a mold frame for covering sidewalls of the light guide plate and receiving the light guide plate to secure the light guide plate relative to the board.

15. The display device according to claim 14, further comprising a bottom case to receive the mold frame, light guide plate and board.

16. The display device according to claim 15, further comprising a top case connected to the bottom case to affix the display unit to the light source module.

17. The display device according to claim 13, wherein the first and second light sources are implemented with light emitting diodes to generate white light.

18. The display device according to claim 13, wherein each of the first and second light sources is implemented with light emitting diodes to generate red light, green light, and blue light.

19. The display device according to claim 13, wherein the display unit is a liquid crystal panel including a color filter substrate, a thin film transistor substrate, and a liquid crystal layer interposed between the color filter substrate and the thin film transistor substrate.

* * * * *